A. ALBRIGHT.

Manufactucture of Rubber-Coated Harness-Trimmings.

No. 5,155.

Reissued Nov. 26, 1872.

Witnesses:

V. C. Clayton

T. G. Clayton

Andrew Albright,

Inventor:

by atty,

J. C. Clayton

THE NORRIS PETERS CO., PHOTO-LITHO., WASHINGTON, D. C.

UNITED STATES PATENT OFFICE.

ANDREW ALBRIGHT, OF NEWARK, NEW JERSEY.

IMPROVEMENT IN THE MANUFACTURE OF RUBBER-COATED HARNESS-TRIMMINGS.

Specification forming part of Letters Patent No. 123,603, dated February 13, 1872; antedated January 27, 1872; reissue No. 5,155, dated November 26, 1872.

DIVISION A.

*To all whom it may concern:*

Be it known that I, ANDREW ALBRIGHT, of Newark, New Jersey, have invented an Improved Die for the Manufacture of Metallic Harness-Trimmings covered with vulcanized rubber, gutta-percha, other known vulcanizable gum, or compressible composition, of which the following is a specification:

My invention consists in making and using a pair of dies for pressing, finishing, polishing, and trimming the edges of the vulcanized coating of harness-trimmings, such as rings, buckles, terrets, hooks, and like articles.

Figure 1:
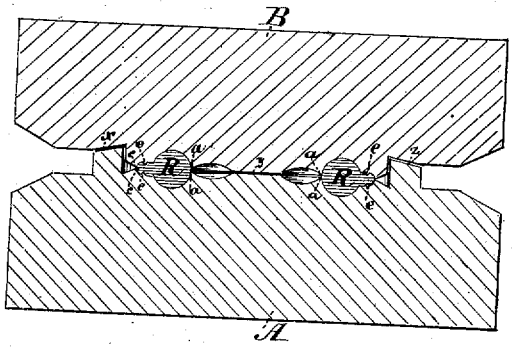
Figure 2:
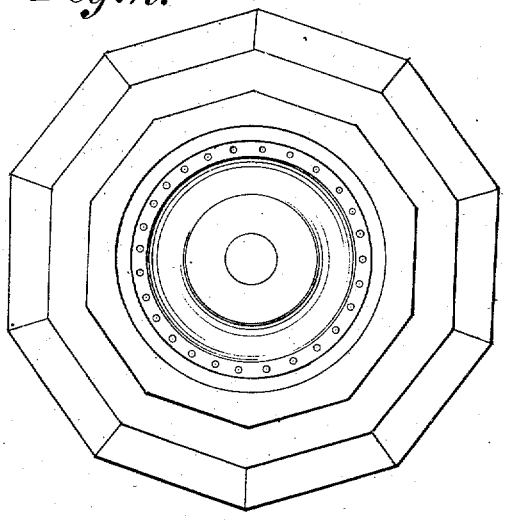

In the drawing, Figure 2 is a plan of one of the dies, both being alike. Fig. 1 is a cross-section of a much-enlarged die.

These dies are to be used after the rubber-coated ring, buckle, or terret, &c., have been vulcanized and removed from the "vulcanizer."

The dies should be provided with cutting-edges for trimming off the superfluous coating. The dies shown in drawing are adapted to the manufacture of rings, buckles, and the like.

In Fig. 1 it will be seen that the dies are beveled off at *a* and *c*, so as to form sharp cutting-edges. These edges *a* cut off the waste of the covering at the inner side, while the edges *c* cut off the waste at the outer side of the ring or buckle. At *e* are shown indentations to imitate stitching or other ornamentation. At *x*, *y*, and *z* the dies touch each other, so that they cannot crush the article placed in them.

The form of the dies will vary with the form of the article to be pressed in them.

In the use of these dies they should be heated, or the vulcanized article should be hot, so that they may be "hot pressed."

The action of the dies is to densify the somewhat porous coating, and to make it harder and tougher and susceptible of a higher polish. It also trims off waste material, ornaments, finishes, and polishes in the best and quickest manner.

I claim—

The dies A and B, substantially as described.

ANDREW ALBRIGHT.

In presence of—

J. C. CLAYTON,

T. B. BEECHER.